United States Patent
Amirijoo et al.

(10) Patent No.: US 8,457,110 B2
(45) Date of Patent: Jun. 4, 2013

(54) TECHNIQUE FOR COORDINATING CS AND PS REGISTRATIONS IN A MULTI-OPERATOR CORE NETWORK

(75) Inventors: Sharokh Amirijoo, Sollentuna (SE); Martin Israelsson, Spanga (SE); Karl-Peter Ranke, Herzogenrath (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1031 days.

(21) Appl. No.: 11/910,012

(22) PCT Filed: Mar. 31, 2006

(86) PCT No.: PCT/EP2006/002960
§ 371 (c)(1), (2), (4) Date: Mar. 11, 2009

(87) PCT Pub. No.: WO2006/103093
PCT Pub. Date: Oct. 5, 2006

(65) Prior Publication Data
US 2009/0213834 A1    Aug. 27, 2009

(30) Foreign Application Priority Data
Mar. 31, 2005 (SE) .................................. 0500730

(51) Int. Cl.
*H04L 12/66* (2006.01)
(52) U.S. Cl.
USPC .......................................................... 370/352
(58) Field of Classification Search
USPC ........................................ 370/352, 354, 355
See application file for complete search history.

(56) References Cited

U.S. PATENT DOCUMENTS

| 2002/0086670 | A1 | 7/2002 | Rajaniemi et al. |
| 2003/0050076 | A1* | 3/2003 | Watanabe ..................... 455/456 |
| 2004/0017798 | A1 | 1/2004 | Hurtta et al. |
| 2004/0105429 | A1 | 6/2004 | Anckar et al. |
| 2004/0162077 | A1* | 8/2004 | Kauranen et al. ............. 455/445 |
| 2005/0090255 | A1* | 4/2005 | Kuchibhotla et al. ...... 455/435.2 |

FOREIGN PATENT DOCUMENTS

WO    WO 2006038076 A1    4/2006

OTHER PUBLICATIONS

SA WG2. CR to TS 23.251: Clarification of PS and CS Domain Registration Coordination (Rel-6). Technical Specification Group Services and System Aspects, Meeting #28, Jun. 2005, TSGS#28(05)0341.Quebec, Canada.

* cited by examiner

*Primary Examiner* — Mark Rinehart
*Assistant Examiner* — Mohammad Anwar
(74) *Attorney, Agent, or Firm* — Roger S. Burleigh (57) ABSTRACT

A technique for coordinating the registration of a terminal (UE) in circuit-switched (CS) and packet-switched (PS) domains of a multi-operator core network (MOCN) with multiple core networks (CN) is described. According to a method approach, a notification message indicating the necessity of coordinated CS and PS registrations for a terminal (UE) is received from a first core network (CN). In a next step, and based on a global permanent identity (IMSI) associated with the terminal (UE), a second core network (CN) responsible for CS and PS registrations is determined. A registration message for coordinated CS and PS registrations is then sent to the second core network (CN) that has been determined based on the global permanent identity (IMSI).

15 Claims, 6 Drawing Sheets

TECHNIQUE FOR COORDINATING CS AND PS REGISTRATIONS IN A MULTI-OPERATOR CORE NETWORK

FIELD OF THE INVENTION

The present invention generally relates to a technique for registering a terminal in a multi-operator core network. In particular, the invention concerns a registration technique that allows for a coordinated registration in the circuit-switched (CS) and packet-switched (PS) domains.

BACKGROUND OF THE INVENTION

Figure 1:
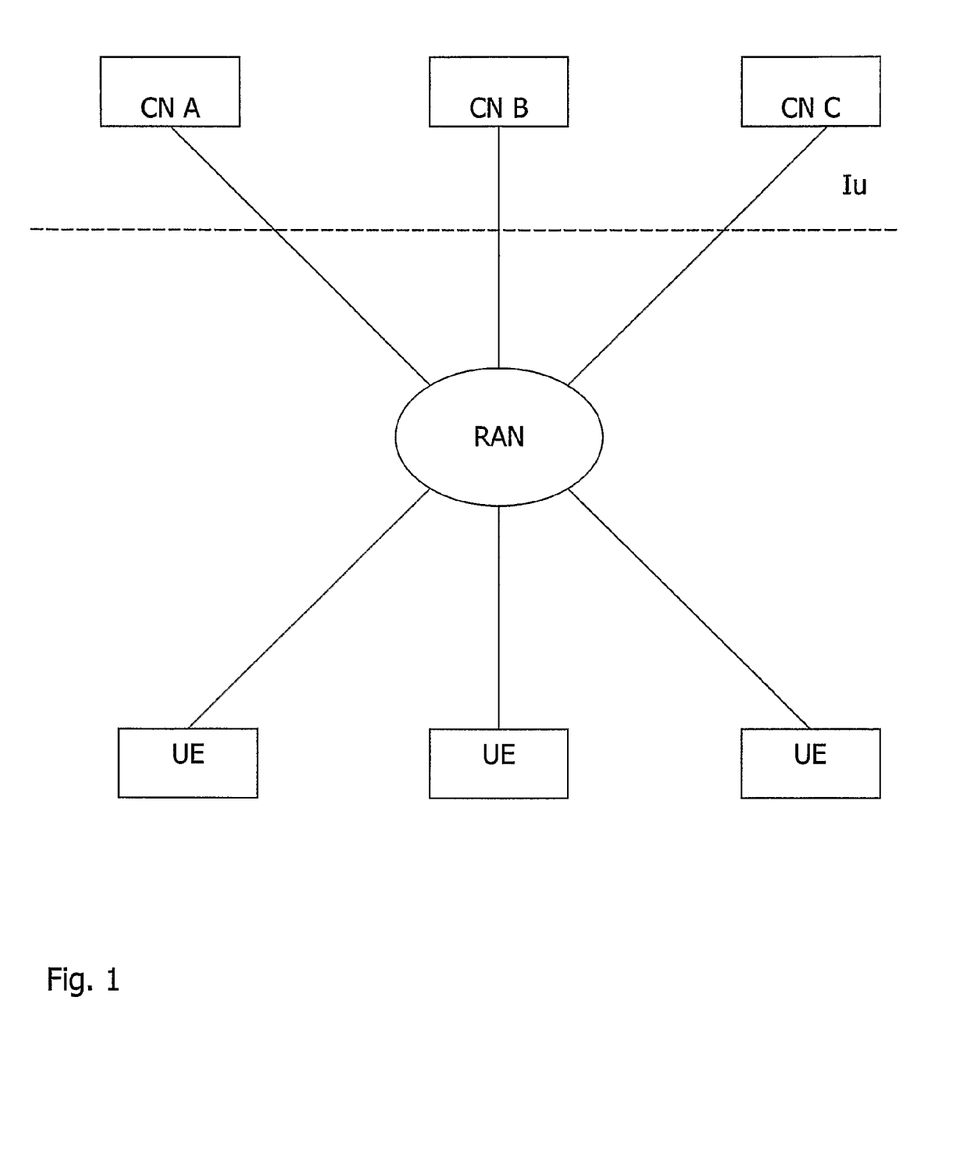
FIG. 1 is a schematic diagram of a MOCN system in which the present invention can be practised.

The high-level architecture of modern telecommunications systems such as the Universal Mobile Telecommunications System (UMTS) typically comprises three different types of network components: Radio Access Networks (RANs), Core Networks (CNs) and User Equipment (UE) as shown in FIG. 1. The CN is responsible for switching and routing calls and data connections to and from external networks such as wire-based telephone networks or the Internet. The RAN is located between the CN and the UE and handles all radio-related functionality. The UE constitutes the interface between the user and the RAN.

A modern CN comprises dedicated nodes for providing CS services on the one hand and PS services on the other hand. CS services are typically provided via a CN node called Mobile Services Switching Centre/Visitor Location Register (MSC/VLR). The part of the CN that is accessed via the MSC/VLR is often referred to as the CS domain. PS services are generally provided via a Serving General Packet Radio Service Support Node (SGSN), and the part of the CN that is accessed via the SGSN is called the PS domain. In conventional telecommunications networks, the CN serves a particular UE often in the CS and PS domains simultaneously.

In recent years, network sharing has become a vehicle for using valuable network resources more efficiently. In one network sharing scenario called Multi-Operator Core Network (MOCN), multiple CNs typically belonging to different operators share a common RAN. In the exemplary MOCN scenario shown in FIG. 1, three CNs (CN A, CN B and CN C) belonging to different CN operators are attached via a so-called Iu interface to a single RAN.

In networks of the MOCN type, it is desirable that a particular UE will be registered in the CS domain (MSC/VLR) and the PS domain (SGSN) of one and the same CN operator. With reference to FIG. 1, it should thus for example be avoided that a particular UE is connected to the MSC/VLR of CN A and to the SGSN of CN B. Such a connection situation will not occur if the UE supports network sharing ("supporting UE"). A supporting UE is configured to select a particular CN as its "serving CN" in the shared network and to signal this selection to the RAN to which the UE is attached. The RAN will then automatically route the PS and CS registration for this UE to the signalled CN.

The supporting UE bases its CN selection on additionally broadcast MOCN system information. However, a UE not supporting network sharing ("non-supporting UE") will simply ignore such additional system information and will thus leave CN selection to its RAN. Conventionally, a RAN bases its CN selection on a Network Resource Indicator (NRI) initially received from the UE that requires registration in the PS and CS domains. The NRI is in most cases indicative of a non-permanent and/or local identity of the terminal. For example, the NRI may be indicative of the Temporary Mobile Subscriber Identity (TMSI) as assigned in the CS domain, or of the P-TMSI as assigned in the PS domain.

Since the RAN does not have any knowledge of how the TMSI and P-TMSI values were assigned in the respective domains, it may send the CS registration message and the PS registration message for a particular UE to two different CNs. If each of the associated CN operators has a roaming agreement with the user of the UE, both CNs will accept the registration of the UE and will send their associated network domain identifier, via the RAN, to the UE. The UE thus receives different network domain identifiers for the CS and PS domains, and faces an inconsistent situation that could give rise to malfunctions.

In order to guarantee in a MOCN scenario that a non-supporting UE is served by one and the same CN operator in both domains, it has been proposed to use an optional interface (the so-called Gs interface) between the MSC/VLR and the SGSN for coordinating UE registrations in the CS and PS domains (see, e.g., section 4.2.5 of Technical Specification 25.251 of the Third Generation Partnership Project 3GPP). However, the optional Gs interface is currently not implemented in all of the CN nodes concerned. Moreover, implementation of the Gs interface is not only costly, but additionally adds a layer of complexity to the CN design.

Accordingly, there is a need for an improved technique that allows for coordinated CS and PS domain registrations.

SUMMARY OF THE INVENTION

According to a first aspect of the invention, this need is satisfied by a method for coordinating the registration of a terminal in CS and PS domains a multi-operator core network with multiple core networks, wherein the method comprises receiving, from a first core network, a notification message indicating the requirement of coordinated CS and PS registrations for a terminal, selecting, based on a global permanent identity associated with the terminal, at least one second core network for coordinated CS and PS registrations, and sending at least one registration message for coordinated CS and PS registrations to the second core network that has been selected based on the global permanent identity.

The first core network and the second core network will in many cases be different core networks of a particular MOCN. However, in some situations the first core network and the second core network may be one and the same network. In other words, the registration message for coordinated CS and PS registrations can in principle be sent to the same core network from which the notification message indicating the requirement of coordinated CS and PS registrations is received.

The approach of sending at least one registration message to a core network that has been selected based on a global permanent identity for CS as well as PS registration does not require the implementation of a Gs interface. In particular, the required messaging can (at least to a large extent) be performed between an access network on the one hand and one or more core networks of the MOCN on the other hand. In an exemplary UMTS context, the messaging may occur via the conventional Iu interface.

The at least one registration message that is sent to the previously selected core network for coordinated CS and PS registrations may include an indication, for the receiving core network, that CS/PS registration coordination has already been performed. The receiving core network may thus be informed that it is responsible for both CS and PS registrations. Additionally, the receiving core network can derive from this indication that no other core network of the MOCN will register the particular terminal in any one of the CS and PS domains.

The at least one registration message for coordinated CS and PS registrations may include the global permanent identity associated with the terminal that is to be registered. The global permanent identity may be an International Mobile Equipment Identity (IMEI), an International Mobile Subscriber Identity (IMSI) or any other identifier uniquely assigned directly or indirectly (e.g. via the subscriber) to the terminal. In one variation, the global permanent identity included in the registration message constitutes an indication for the recipient of the registration message that CS/PS registration coordination has already been performed (e.g. by the sender of the registration message). If, on the other hand, a local and/or temporary identity (or no is identity at all) should be included in the registration message, the receiving core network can deduce that no CS/PS registration coordination has been performed yet and that CS/PS registration coordination may still be required.

A core network receiving an initial registration message not including the indication that CS/PS registration coordination has already been performed may request coordinated CS and PS registrations by sending the corresponding notification message to a network component (such as a node of an access network) capable of determining at least one core network responsible for coordinated CS and PS registrations. This network component receiving the notification message will typically be the same network component which sent (e.g. forwarded) an initial registration message. In response to receipt of the notification message, the network component may then determine one or more core networks of the MOCN responsible for CS and PS registrations as outlined above and send at least one further registration message to the one or more core networks thus determined.

The global permanent identity associated with the terminal that is to be registered may be obtained in various ways. According to a first option, the global permanent identity is included in the notification message received from a core network. According to a second option, the global permanent identity is directly received from the terminal (e.g. together with a registration message that is to be forwarded to the MOCN). According to a further option, the global permanent identity is locally known (e.g. from a previous registration procedure).

In one variation, the step of selecting at least one core network responsible for CS and PS registrations comprises ordering two or more (or all) core networks of the MOCN dependent on the global permanent identity associated with the terminal. Thus, a "search order" among the core networks of the MOCN may be obtained. Then, registration messages may successively be sent to the two or more core networks in the selected order. If independent registration messages for CS registration on the one hand and PS registration on the other hand are used, the same ordering among the core networks is preferably used for sending both the PS registration messages and the CS registration messages.

The step of successively sending registration messages to the core networks in the selected order may be continued as long as rejection messages (e.g. due to lacking roaming agreements) are returned from the addressed core networks. In addition, or alternatively, the step of successively sending the registration messages may be aborted as soon as one of the receiving core networks acknowledges registration of the terminal.

According to a further aspect of the invention, a method for coordinating the registration of a terminal in CS and PS domains of a multi-operator core network with multiple core networks is provided, wherein the method includes receiving at least one registration message requesting registration of a terminal, determining whether the terminal requires coordinated CS and PS registrations, and, depending on the determination, sending a notification message indicating the requirement of coordinated CS and PS registrations for the terminal.

The received registration message may be an initial registration message including a parameter indicative of an identity associated with the terminal. In such a scenario, the requirement of coordinated CS and PS registrations for a terminal may be determined based on an evaluation of whether or not the received registration message is indicative of a permanent global identity. If, for example, the evaluation shows that the parameter is constituted by a permanent global identity, it may be concluded that the sender of the registration message has already coordinated CS/PS registrations. In this case, the notification message need not be sent. If, on the other hand, the parameter is not included, or not constituted by the permanent global identity (but, e.g., by a local and/or temporary identity), it may be determined that CS/PS registration coordination is required and the corresponding notification message may actually be sent.

The invention can be practised in the form of one or more pieces of hardware, as a software solution or as a combined software/hardware approach. According to a software aspect, a computer program product comprising program code portions for performing the steps of the present invention when the computer program product is run on one or more computing devices is provided. The computer program product may be stored on a computer-readable recording medium.

As for a hardware aspect, a device for coordinating the registration of a terminal in CS and PS domains of a multi-operator core network with multiple core networks is provided, the device comprising a first interface adapted to receive, from a first core network, a notification message indicating the requirement of coordinated CS and PS registrations for a terminal, a unit adapted to select, based on a global permanent identity associated with the terminal, at least one second core network for coordinated CS and PS registrations, and a second interface adapted to send at least one registration message for coordinated CS and PS registrations to the at least one second core network that has been selected based on the global permanent identity. The device may be included in or constituted by a node of an access network (e.g. by a RAN node). The first interface and the second interface can be different or identical interfaces.

According to a further hardware aspect of the present invention, a device for coordinating the registration of a terminal in CS and PS domains of a multi-operator core network with multiple core networks is provided, the device comprising a first interface adapted to receive at least one registration message requesting registration of a terminal, a unit adapted to determine whether coordinated CS and PS registrations for the terminal are required, and a second interface adapted to send, depending on the determination, a notification message indicating the necessity of coordinated CS and PS registrations for the terminal. The device may be included in or constituted by a core network node of a MOCN. The first interface and the second interface of this device may be different or identical interfaces.

BRIEF DESCRIPTION OF THE DRAWINGS

In the following, the invention will be described with reference to exemplary embodiments illustrated in the drawings, wherein.

DETAILED DESCRIPTION OF THE PREFERRED EMBODIMENTS

In the following description, for purposes of explanation and not limitation, specific details are set forth, such as particular sequences of steps, messaging sequences and device configurations in order to provide a thorough understanding of the present invention. It will be apparent to one skilled in the art that the present invention may be practised in other embodiments that depart from these specific details. In particular, while some embodiments will be described below in a UMTS context and with respect to a specific 3GPP messaging scheme, it is to be understood that the invention can also be implemented in combination with other telecommunications standards such as CDMA2000 and other messaging mechanisms.

Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and memory coupled to the processor, wherein the memory is encoded with one or more programs that may perform the functions disclosed herein.

Figure 2:
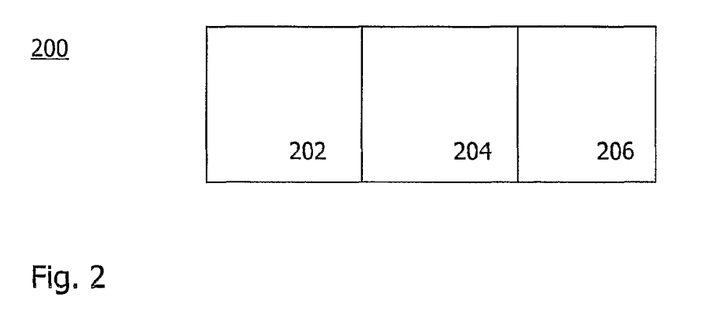
FIG. 2 is a schematic diagram illustrating a device according to a first embodiment of the present invention.

FIG. 2 shows an embodiment of a device 200 for coordinating the registration of a UE in CS and PS domains of a MOCN with multiple CNs. The device 200 comprises a first interface 202 adapted to receive from a first CN a notification message. The notification message indicates to the receiver that a particular UE requires coordinated CS and PS registrations. That is, the UE is to be registered in the CS and PS domains of one and the same CN of the MOCN.

The device 200 further comprises a unit 204 adapted to select at least one second CN that is responsible for CS and PS registration of the particular UE. The unit 204 determines the second CN based on a global permanent identity associated with the UE that is to be registered. In other words, a (truly) unique identifier of the UE is used to select at least one second CN for registering the UE in both the CS domain (MSC/VLR) and the PS domain (SGSN). In one variation, the unique identifier is used to determine a selection order among two or more (or all) CNs of the MOCN.

The device 200 additionally comprises a second interface 206 that could be constituted by the first interface 202 or that could be provided in the form of a separate interface. The second interface 206 is adapted to send at least one registration message for coordinated CS and PS registrations. The registration message is sent to at least one of the second CNs that have been selected by the unit 204 based on the global permanent identity. The selection of several second CNs may be performed such that the global permanent identity is analysed for ordering the second CNs in a predefined manner and for successively sending registration messages to the second CNs in the determined order (e.g. until one second CN accepts the UE for registration in both domains).

In one scenario, there may be an association between individual global permanent identities (or, in the case of numerical global permanent identities, of global permanent identity ranges) on the one hand and identifiers of individual CNs on the other hand. Such an association may then be used by the unit 204 for looking up, based on the global permanent identity for a particular terminal, the associated CN identifier or CN identifiers indicative of the at least one second CN.

Figure 3:
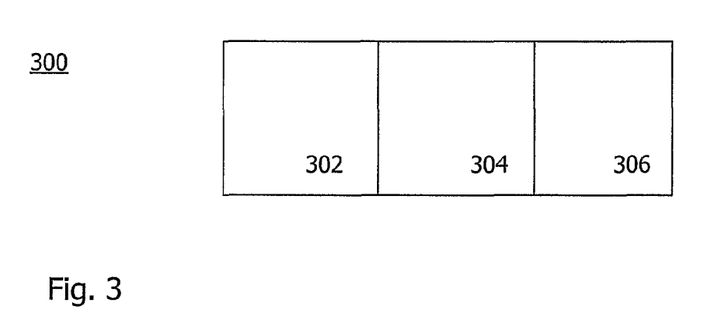
FIG. 3 is a schematic diagram illustrating a device according to a second embodiment of the present invention.

FIG. 3 shows another device 300 for coordinating the registration of a UE in CS and PS domains of a MOCN with multiple CNs. The device 300 may be in communication with the device 200 discussed above with reference to FIG. 2. In the case the devices 200, 300 are configured in accordance with the UMTS standard, they may communicate with each other via the Iu interface. In such a scenario, each of the interfaces of the devices 200, 300 may be configured as Iu interface.

Referring now to FIG. 3, the device 300 comprises a first interface 302 adapted to receive at least one registration message requesting registration of a UE. The content of the registration message can be a request for CS registration, a request for PS registration or a request for combined CS and PS registrations.

A unit 304 of the device 300 is adapted to determine whether coordinated CS and PS registrations are required. This determination is performed in response to receipt of the registration message via the first interface 302. According to a first option, the unit 304 bases its determination on locally available information. According to a second option, the determination is based on the content of the registration message received via the first interface 302. If, for example, the sender of the registration message is configured to include an indication in the registration message that the sender has already performed CS/PS registration coordination, a registration message not including this indication will indicate to the unit 304 that coordinated CS and PS registration is still required.

The device 300 additionally includes a second interface 306 that could be constituted by the first interface 302 or, in the alternative, take the form of a separate interface. The second interface 306 is adapted to send a notification message depending on the determination performed by the unit 304. This notification message indicates the necessity of coordinated CS and PS registrations for the UE in the case the unit 304 could determine that registration coordination has not yet be performed.

In the following, two method embodiments of the present invention will be described with reference to the flowcharts 400, 500 of FIGS. 4 and 5. In the exemplary embodiments, it will be assumed that the methods are performed by the devices 200, 300 shown in FIGS. 2 and 3. It should be noted, however, that the methods could also be performed by devices having a different configuration.

Figure 4:
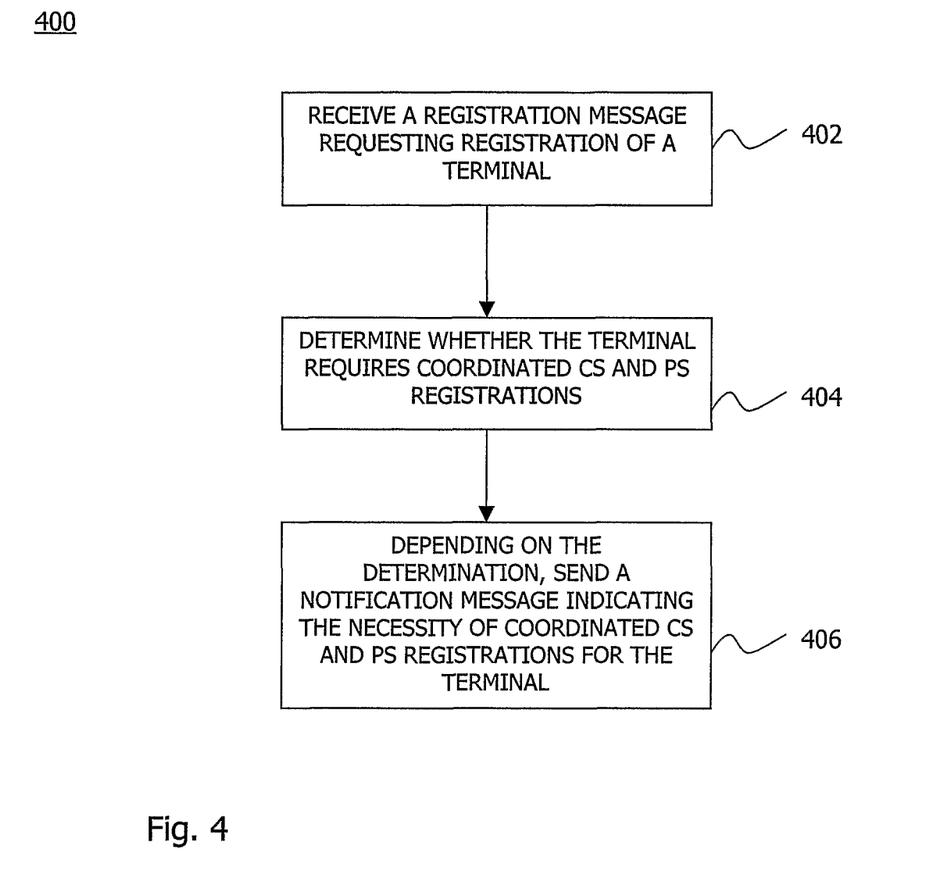
FIG. 4 is a schematic flowchart illustrating a first method embodiment of the present invention.

Referring to FIGS. 3 and 4, a first method embodiment starts with receiving, at the device 300 via the interface 302, a registration message that could have been sent by the device 200 of FIG. 2. The registration message received in step 402 requests registration of a UE.

In a next step 404 it is determined, by the unit 304 of device 300, whether the UE requires coordinated CS and PS registrations. This determination can be performed as discussed above in context with unit 304.

If it is determined in step 404 that coordinated CS and PS registrations are required, a corresponding notification message will be sent in step 406 via the interface 306 of device 300.

Figure 5:
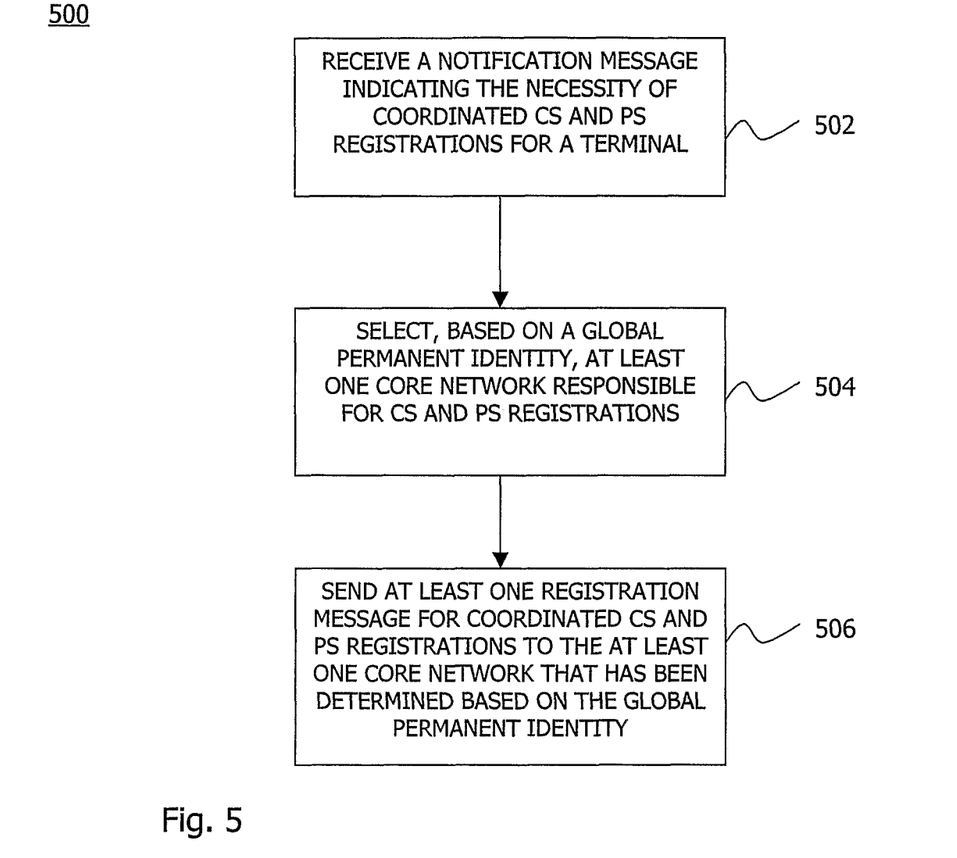
FIG. 5 is a schematic flowchart illustrating a second method embodiment of the present invention.

Referring now to FIGS. 2 and 5, the notification message sent in step 406 is preferably received by the device 200 via the interface 202 (as indicated by step 502).

In a next step 504, the unit 204 of device 200 selects, based on a global permanent identity associated with the UE, one or more CNs of the MOCN for combined CS and PS registrations. The global permanent identity can be locally known to the device 200. Alternatively, the device 200 may have obtained knowledge of the global permanent identity via the notification message received in step 502 and/or via a message that has been received earlier from the UE that requires coordinated CS and PS registrations.

Once at least one CN has been determined for the combined CS and PS registrations of the particular UE in step 504, a combined PS/CS registration message or dedicated CS and PS registration messages are sent to this CN in step 506. The at least one registration message is sent via the interface 206 of device 200. It should be noted that the recipient (e.g. a node of a first CN) of the registration message that is sent in step 506 will in general be different from the sender (e.g. a node of a second CN) of the notification message that is received in step 502. However, it may also occur that the recipient of the registration message sent in step 506 is identical with the sender of the notification message received in step 502.

Now, a messaging embodiment of the present invention will be described in an exemplary UMTS context with reference to FIGS. 6 to 8. The messaging embodiment is compatible with Technical Specification 25.413 (Release 6) titled "UTRAN Iu interface RANAP signalling" of 3GPP, in particular versions 6.5.0 and earlier, herewith incorporated by reference with respect to UE registration messaging, registration parameters and registration configurations. The present embodiment will be described in relation to INITIAL UE messaging and DIRECT TRANSFER messaging as set forth in sections 8.22 and 8.23 of this Technical Specification. The purpose of INITIAL UE messaging is the establishment of a signalling connection via the Iu interface between a CN domain and the RAN (that is, the Radio Network Controller—RNC—of the RAN). The purpose of DIRECT TRANSFER messaging is the transfer of UE-CN signalling messages over the signalling connection thus established by INITIAL UE messaging via the Iu interface.

In general, there are several occasions that require CS and/or PS domain registration for a UE. These occasions include Location Area Update (LAU) and Routing Area Update (RAU). A UE 10 requiring LAU or RAU will send a Radio Resource Control (RRC) INITIAL DIRECT TRANSFER message to the RAN 12 to which the UE 10 is attached (see FIG. 6). The INITIAL DIRECT TRANSFER message will include an initial LAU or RAU Non Access Stratum (NAS) message with the Information Element (IE) "Intra Domain NAS Node Selector" (IDNNS). The IDNNS IE includes an IE that is called "Routing Parameter" and used to transport the Network Resource Identifier (NRI).

As has already initially been explained, the NRI forms the basis for the RAN 12 to select a particular CN (or CN node) of a MOCN, and for routing the one or more registration messages for the UE 10 accordingly. The IDNNS IE will include an identifier such as the International Mobile Equipment Identity (IMEI), the International Mobile Subscriber Identity (IMSI) or the Temporary Mobile Subscriber Identity (TMSI for the CS domain and P-TMSI for the PS domain) associated with the UE 10, respectively. The IMEI and IMSI constitute permanent global identities associated with the UE 10. On the other hand, the TMSI and P-TMSI are only valid locally in the particular Location Area (LA) or Routing Area (RA). IMSI and IMEI are used very seldom and generally only for the very first registration of the UE (when the TMSI and P-TMSI are not yet available).

For UEs roaming into a particular CN, the initial registration is performed using TMSI/P-TMSI plus the Location Area Identity (LAI)/Routing Area Identity (RAI) where this TMSI/P-TMSI was assigned. The LAI/RAI contains the Public Land Mobile Network (PLMN) identity of the PLMN where the TMSI/P-TMSI was assigned. It should be noted that the LAI/RAI indicative of the PLMN where the TMSI/PTMSI was assigned is not included in the RRC INITIAL DIRECT TRANSFER message shown in FIG. 6, but in another message (the RRC CONNECTION REQUEST message).

For UEs roaming within one and the same CN, the NRI value sent in the IDNNS IE can be used to uniquely identify the CN (or CN operator) responsible for registration of the UE. Typically, the NRI values used between sharing CNs are coordinated to avoid the need of re-routing the registration message for a particular UE to another CN.

As mentioned above, each NRI value is typically based on the TMSI/P-TMSI that is only locally valid in the specific LA/RA. Accordingly, for a UE roaming in from another CN (CN operator) than the ones sharing a particular RAN, the NRI value can thus not be used to uniquely identify a particular CN (CN operator). This situation requires the implementation of a re-routing mechanism because there is a certain likelihood that the initial registration message will be routed to a CN for which there does not exist a valid roaming agreement between the user of the UE and the respective CN operator. This re-routing procedure is defined in Technical Specification 25.413 mentioned above. The present embodiment makes use of this re-routing mechanism for a coordination of CS/PS domain registrations. Accordingly, although the re-routing mechanism was originally implemented for other purposes, it can be modified such that it may also be used for CS/PS registration coordination without the need to rely on the Gs interface that has been proposed in the prior art for this purpose.

For roaming UEs, the undesirable situation of sending PS and CS registration messages to CNs of different CN operators could be avoided if the Initial UE Identity in the RRC CONNECTION REQUEST message was based on a permanent global identity such as the IMSI or IMEI. On the other hand, for roaming UEs for which the Initial UE Identity as included in the RRC CONNECTION REQUEST message is not based on the permanent global identity (but, e.g., on the TMSI/P-TMSI), it is proposed in the present embodiment that a CN receiving a registration message requesting registration for such a UE rejects the registration (even if the operator of the CN has a roaming agreement with the home operator of the user of the UE) and informs the RAN (or, more specifically, the RNC included in the RAN) by an appropriate indicator that CS/PS registration coordination is required from the RAN. This indication can be included in a Radio Access Network Application Part (RANAP) message of the DIRECT TRANSFER type. The corresponding messaging will now be explained in more detail with reference to FIGS. 7 to 9.

Figure 6:
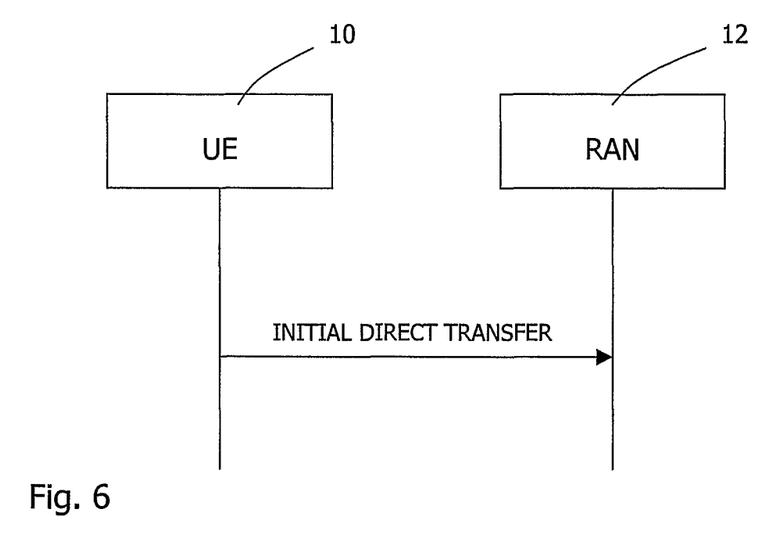
FIG. 6 is a schematic diagram illustrating an embodiment of a first messaging scenario.
Figure 7:
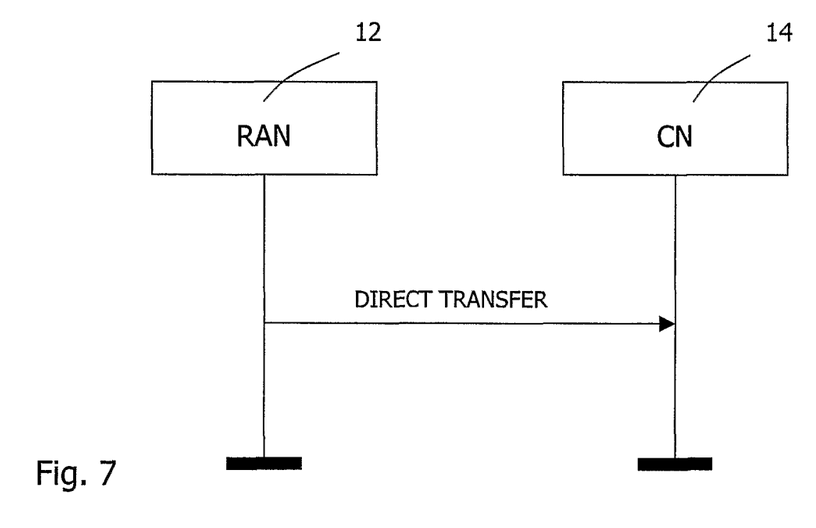
FIG. 7 is a schematic diagram illustrating an embodiment of a second messaging scenario.

After the RAN 12 has received the INITIAL DIRECT TRANSFER message as shown in FIG. 6, it will route corresponding CS/PS registration messages as shown in FIG. 7 to one or more first CNs 14 that have been selected in a conventional manner. Upon receipt of the registration message, each first CN 14 will determine whether or not coordinated CS/PS registration is required (e.g. whether CS/PS registration coordination has been already been performed by the RAN 12). This determination may include an evaluation of the content of the registration message received from the RAN 12. In this context, it may for example be evaluated whether or not a parameter indicative of a permanent global identity associated with the UE 10 is included in the registration message as described above.

Figure 8:
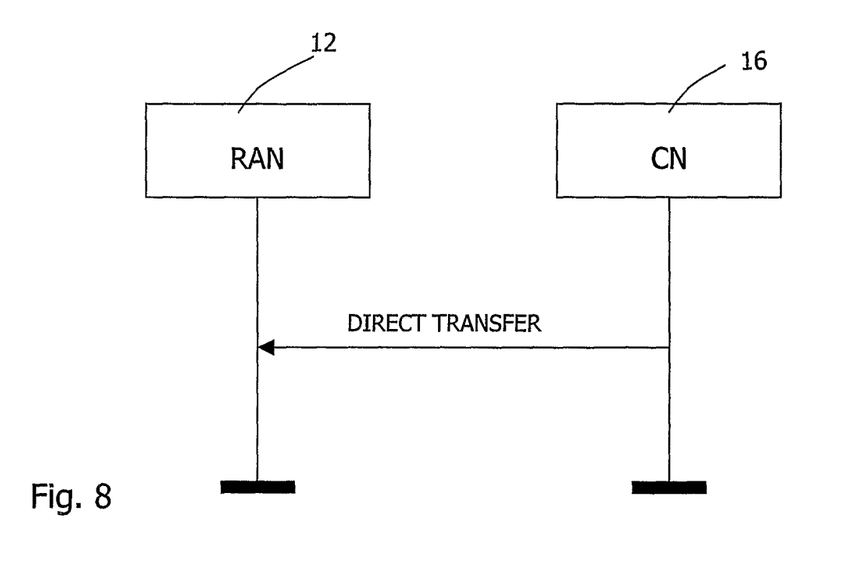
FIG. 8 is a schematic diagram illustrating an embodiment of a third messaging scenario.

If the first CN 14 determines that coordinated CS and PS registration is required, and preferably regardless of the fact of whether or not there exists a roaming agreement for the UE 10, the first CN 14 sends a corresponding notification message of the DIRECT TRANSFER type to the RAN 12 as shown in FIG. 8. This DIRECT TRANSFER message includes an indication to the RAN 12 that coordinated CS and PS registration is required. According to a first option, this indication is a separate CS/PS Coordination Indication IE. According to a further option, the indication is constituted by a new setting (or value) of the existing Reject Cause Value IE as defined in section 9.2.3.36 titled "Redirection Indication" of Technical Specification TS 25.413. Moreover, when the first CN 14 determines the requirement for CS/PS registration coordination for the UE 10, the DIRECT TRANSFER message shown in FIG. 8 can additionally (and, in the present embodiment, mandatorily) include a global permanent identity such as the IMSI associated with the UE 10.

Figure 9:
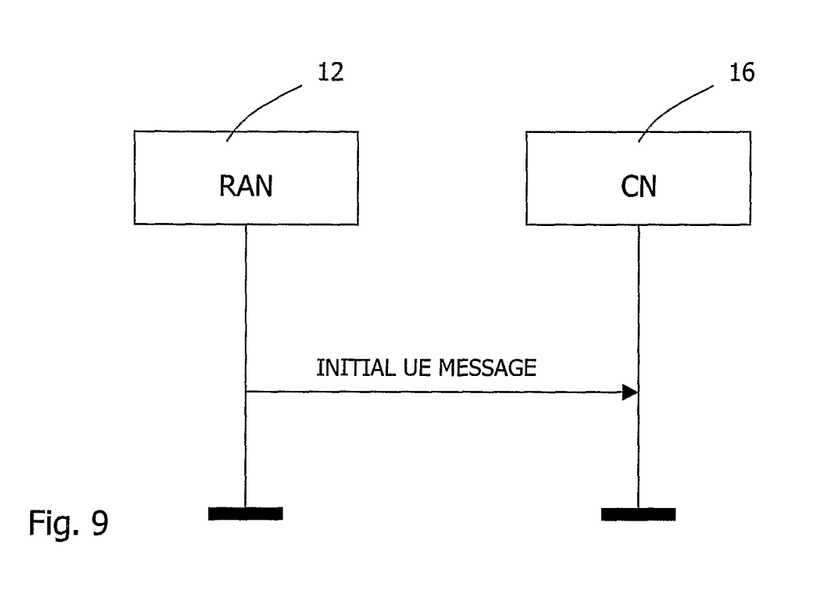
FIG. 9 is a schematic diagram illustrating an embodiment of a fourth messaging scenario.

Upon receipt of the DIRECT TRANSFER message shown in FIG. 8 with the global permanent identity, the RAN 12 will analyse the global permanent identity (i.e. the IMSI) included therein to select one or more second CNs (in a specific order) based on the global permanent identity as the responsible entity for CS and PS registration. Then, the registration messages for the CS and PS domains will be re-routed in the specific order to the second CNs thus determined. As shown in FIG. 9, the re-routed registration messages can be included in a RANAP INITIAL UE message sent from the RAN 12 to the second CN 16.

The INITIAL UE message sent to the second CN 16 as shown in FIG. 9 also includes the Permanent NAS UE Identity IE and the NAS Sequence Number IE. The inclusion of one or both of these IEs constitutes an indication to the second CN 16 that CS/PS coordination has already been performed by the RAN 12.

The analysis of the global permanent identity by the RAN 12 in context with selecting the second CN 16 (or an order of second CNs 16) may be performed in various ways. In the present case in which the global permanent identity is constituted by an IMSI, distributing RAN 12 can perform IMSI number analysis as follows: if the Mobile Country Code (MCC) and Mobile Network Code (MNC) included in the IMSI identify one of the CNs who share the particular RAN 12, then the RAN 12 (that is, the RNC of the RAN 12) selects this CN and routes the registration request to the particular CN thus selected. This CN will then be responsible for combined CS and PS registrations.

Otherwise, i.e. if no CN belonging to the CNs that share RAN 12 can be identified, then RAN 12 derives a routing parameter from the IMSI in the same way as a UE would typically derive the routing parameter in the IDNNS IE based on IMSI, namely according to the formula "DecimalToBinary [(IMSI div 10) mod 1000]". Application of this formula to the IMSI will result in a value between 0 and 999. Typically, the corresponding values will be equally distributed over all UEs (for the respective subscribers). The CN selection by the RAN 12 can thus be based on IDNNS ranges.

In the example of FIG. 1 with 3 CNs (CN A, CN B, CN C) belonging to different CN operators, the following selection mechanism could be implemented by the RAN 12:
 IDNNS range [0 ... 333]: Select CN A first, if re-routing required (e.g. due to a lacking roaming agreement) select CN B, and then CN C;
 IDNNS range [334 ... 666]: Select CN B first, if re-routing required select CN C, and then CN A;
 IDNNS range [667 ... 999]: Select CN C first, if re-routing required select CN A, and then CN B.

The selection mechanism outlined above guarantees that CNs for combined CS and PS registrations are selected according to a pre-defined order and based on an NRI value that is extracted from a permanent global identity. By applying the same routing order to both CS registration messages and PS registration messages, the routing of CS and PS registration messages to different CNs can be avoided.

As has become apparent from the above description of preferred embodiments, coordinated CS and PS domain registrations can be performed without the necessity of implementing, in an exemplary UMTS context, the Gs interface. Rather, CS and PS domain registration coordination can be achieved by using messaging scenarios involving the existing Iu interface. In one preferred embodiment, CS/PS registration coordination is implemented in combination with the re-routing mechanism described in Technical Specification 25.413.

It will be appreciated by those skilled in the art that the above-described methods and devices can be adapted or extended in various ways. While the foregoing description makes reference to preferred embodiments, the scope of the invention is defined solely by the claims that follow and the elements recited therein.

The invention claimed is:

1. A method in a radio access network (RAN) device for coordinating the registration of a mobile terminal that does not support network sharing in circuit-switched (CS) and packet-switched (PS) domains of a multi-operator core network with multiple core networks, the method comprising the steps of:
 receiving, from a device in a first core network, a notification message indicating the requirement of coordinated CS and PS registrations for the mobile terminal;
 selecting, based on a global permanent identity associated with the mobile terminal, a second core network for coordinated CS and PS registrations; and,
 sending, to a device in the selected second core network, at least one registration message for coordinated CS and PS registrations for said mobile terminal, whereby said mobile terminal is registered with the CS and PS domains of said second core network without input from said mobile terminal.

2. The method of claim 1, wherein the registration message includes an indication, for the second core network, that CS/PS registration coordination has already been performed.

3. The method of claim 2, wherein the presence of the global permanent identity in the registration message constitutes the indication that CS/PS registration coordination has already been performed.

4. The method of claim 1, further comprising including the global permanent identity in the registration message.

5. The method of claim 1, further comprising:
sending an initial registration message to the first core network, the initial registration message lacking an indication that CS/PS registration has already been performed; and
receiving the notification message from the first core network in response to the initial registration message.

6. The method of claim 1, wherein the notification message received from the first core network includes the global permanent identity.

7. The method of one claim 1, wherein the global permanent identity is an International Mobile Subscriber Identity or an International Mobile Equipment Identity.

8. The method of claim 1, wherein communication with the first core network and second core network is performed via an Iu interface.

9. The method of claim 1, wherein selecting the at least one second core network comprises selecting two or more second core networks of the multi-operator core network in a specific order dependent on the global permanent identity associated with the terminal.

10. The method of claim 9, wherein sending the at least one registration message comprises successively sending the at least one registration message to the second core networks in the determined order.

11. The method of claim 10, further comprising:
receiving from one of the selected second core networks, in response to the at least one registration message, a rejection message; and,
determining the next second core network in accordance with the selected order and sending the at least one registration message to the second core network thus determined.

12. The method of claim 1, wherein the step of sending the at least one registration message for coordinated CS and PS registrations includes sending in the specific order a separate registration message for each of CS registration and PS registration.

13. The method recited in claim 1, wherein said RAN device is a Radio Network Controller (RNC).

14. A radio access network (RAN) device for coordinating the registration of a mobile terminal that does not support network sharing in circuit-switched (CS) and packet-switched (PS) domains of a multi-operator core network with multiple core networks, the device comprising:

a first interface adapted to receive, from a device in a first core network, a notification message indicating the requirement of coordinated CS and PS registrations for the mobile terminal;

a unit adapted to select, based on a global permanent identity associated with the mobile terminal, at least one second core network for coordinated CS and PS registrations; and, a second interface adapted to send, to a device in the selected second core network, at least one registration message for coordinated CS and PS registrations for said mobile terminal, whereby said mobile terminal is registered with the CS and PS domains of said second core network without input from said mobile terminal.

15. The RAN device recited in claim 14, wherein said RAN device is a Radio Network Controller (RNC).

* * * * *